United States Patent [19]
Biek et al.

[11] Patent Number: 5,935,665
[45] Date of Patent: Aug. 10, 1999

[54] FIRING CONTAINER AND METHOD OF MAKING THE SAME

[75] Inventors: Kenneth Biek, Barrington; Arthur Esposito, Elgin, both of Ill.

[73] Assignee: Magneco/Metrel, Inc., Addison, Ill.

[21] Appl. No.: 08/739,715

[22] Filed: Oct. 29, 1996

[51] Int. Cl.⁶ .................................................. B28B 21/00
[52] U.S. Cl. ................................................ 428/34.4; 51/309
[58] Field of Search ............................... 51/309; 428/34.4

[56] References Cited

U.S. PATENT DOCUMENTS

| | | | |
|---|---|---|---|
| 3,607,685 | 9/1971 | Johnson | 204/67 |
| 3,841,884 | 10/1974 | Farris et al. | 106/65 |
| 3,943,009 | 3/1976 | Hipp | 136/177 |
| 4,356,271 | 10/1982 | Francis | 501/84 |
| 4,432,798 | 2/1984 | Helferich | 106/38.3 |
| 4,623,131 | 11/1986 | Roberts | 266/280 |
| 4,874,726 | 10/1989 | Kleeb et al. | 501/124 |
| 5,035,723 | 7/1991 | Kalinowski | 51/309 |
| 5,094,672 | 3/1992 | Giles | 51/309 |
| 5,104,424 | 4/1992 | Hickory | 51/309 |
| 5,110,322 | 5/1992 | Narayanan | 51/309 |
| 5,129,919 | 7/1992 | Kalinowski | 51/309 |
| 5,143,777 | 9/1992 | Mills | 428/212 |
| 5,147,830 | 9/1992 | Banerjee et al. | 501/89 |
| 5,203,886 | 4/1993 | Sheldon | 51/309 |
| 5,252,526 | 10/1993 | Whittemore | 501/127 |
| 5,422,323 | 6/1995 | Banerjee et al. | 501/100 |

*Primary Examiner*—Paul R. Michl
*Attorney, Agent, or Firm*—Brinks Hofer Gilson & Lione

[57] ABSTRACT

A lightweight firing container and a method of making the same are disclosed. The firing container comprises from about 55–90% by weight of a refractory base material and from about 0.1%–80% by weight fused alumina bubbles.

10 Claims, 1 Drawing Sheet

FIRING CONTAINER AND METHOD OF MAKING THE SAME

BACKGROUND OF THE INVENTION

The present invention is directed toward a method of making a novel, lightweight firing container using fused alumina bubbles. The present invention also relates to lightweight firing containers manufactured with fused alumina bubbles.

Firing containers are used for holding parts that require firing. The weight of conventional firing containers is high compared to the amount of material they hold. For instance, one size of firing containers weighs about 22.5 pounds and holds only approximately 5 pounds of material.

The general procedure for firing begins with loading the firing containers with parts that need to be fired. Loaded firing containers are then placed on kiln cars and fired to temperatures up to approximately 3200 degrees Fahrenheit. After the firing is complete, and the loaded firing containers have cooled to a temperature suitable for handling, the firing containers are removed from the kiln cars and the fired products are dumped from the containers. The firing containers are then reloaded and the entire process is repeated. These firing containers are stacked on kiln cars in such a manner that the operator must either lift the filled containers to a position over his head or reach across a distance to set them on a stack.

Because the firing containers are heavy, the lifting and stacking can result in fatigue or injury to the operator. It is, therefore, desirable to decrease the weight of the firing containers so that the operator experiences less stress on his body and is less likely to injure himself.

The reduction in the weight of the firing containers, however, cannot greatly reduce the performance of the container. The performance of a firing container is based on the ability of the container both to withstand repeated heating and cooling cycles without excessive cracking and to retain its dimensional integrity. The bottom of the firing container must not warp to such a degree that the container becomes unusable. A need, therefore, exists for a lightweight firing container that is able to survive the repeated heating and cooling cycles without cracking or warping.

SUMMARY OF THE INVENTION

It has now been found that, according to the present invention, a lightweight firing container can be manufactured by replacing some of the heavier, solid tabular alumina generally used in making firing containers with lighter weight fused alumina bubbles. Use of the lightweight alumina bubbles is especially desirable in containers, such as firing containers, weighing more than 10 pounds each. In accordance with the present invention, a firing container of the size mentioned above can be reduced from a weight of 22.5 pounds to about 17.5 pounds. The inclusion of the alumina bubbles in place of the tabular alumina, therefore, causes the firing container to have a lighter weight and makes it easier for the operator to handle.

In a first embodiment, the present invention is a lightweight firing container containing about 55–90% by weight of a refractory base material comprising tabular alumina, mullite and clay and about 0.1–80% by weight fused alumina bubbles.

In a second embodiment, the invention is a method of making a lightweight firing container comprising the steps of forming a casting composition by dry mixing a compound comprising about 55–90% by weight of a refractory base material comprising tabular alumina, mullite and clay and about 0.1–80% by weight fused alumina bubbles; adding water to the dry ingredients to obtain a desirable casting consistency; transferring the casting composition to a plaster mold; and molding the casting composition to form a firing container.

The foregoing and other features and advantages will become apparent from the following detailed description of the presently preferred embodiments, when read in conjunction with the accompanying examples. The detailed description and examples are merely illustrative of the invention rather than limiting, with the scope of the invention being defined by the appended claims and equivalents thereof. It is noted that, unless otherwise stated, all percentages given in this specification and the appended claims refer to percentages by weight of the total composition.

DETAILED DESCRIPTION OF THE PREFERRED EMBODIMENTS

Figure 1:
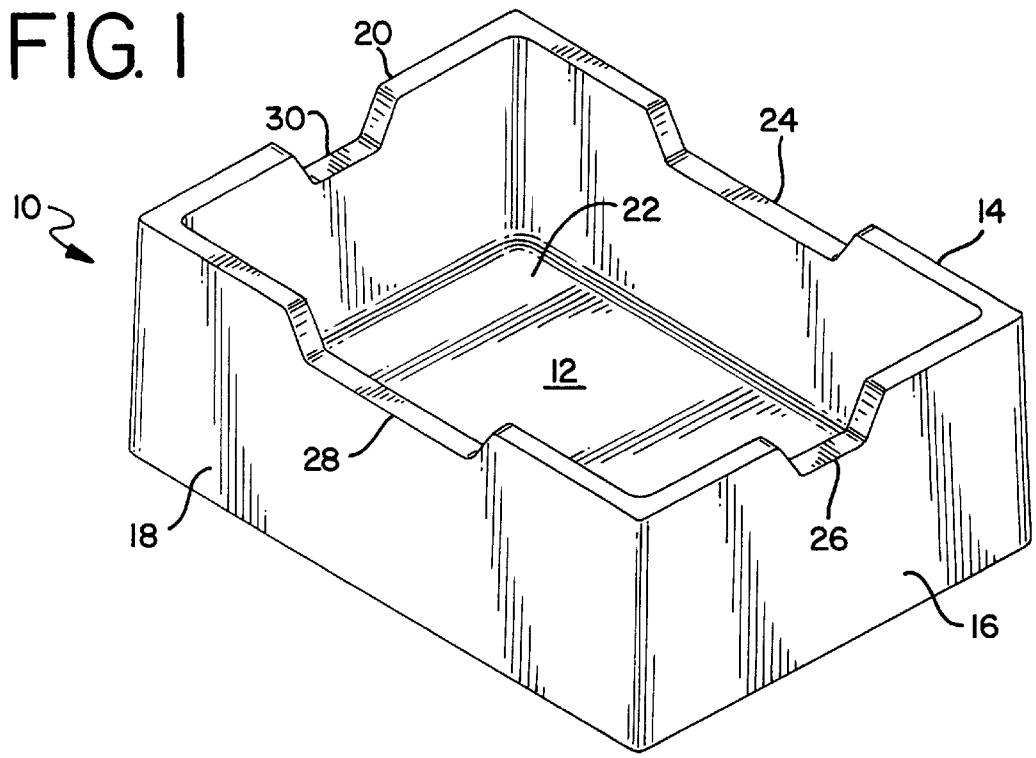
FIG. 1 illustrates the lightweight firing container of the present invention.

The firing containers of the present invention include, as an essential component, fused alumina bubbles. Fused alumina bubbles are hollow alumina spheres. The fused alumina bubbles are lighter in weight than tabular alumina because they are hollow, as opposed to tabular alumina, which is solid. According to the present invention, lightweight firing containers are made by replacing some of the solid, tabular alumina with fused alumina bubbles. Firing containers of the present invention include fused alumina bubbles in two different particle sizes: (1) those passing through a 4 mesh screen and retained on a 10 mesh screen, and (2) those passing through an 8 mesh screen and retained on a 20 mesh screen. Each size of alumina bubbles is present in an amount from about 0.1% to about 40%. Preferably, each particle size of alumina bubbles is present in an amount between about 1% and 20%. More preferably, each particle size is present in an amount between about 5% and 15%. According to a preferred embodiment, the firing containers of the present invention contain about 7% fused alumina bubbles passing through a 4 mesh screen and retained on a 10 mesh screen and about 7% fused alumina bubbles passing through an 8 mesh screen and retained on a 20 mesh screen.

The firing containers of the present invention also includes a refractory base material in an amount between about 55% and about 90% by weight. The refractory base material comprises tabular alumina, mullite and clay.

Tabular alumina is a term of art that refers to a white, opaque material including approximately 98.5–99.9% by weight alumina and smaller amounts of sodium oxide, silica, magnesium oxide and calcium oxide. The tabular alumina suitable for use in the present invention should be fine tabular alumina preferably having particle sizes of 28/F and –325. The tabular alumina of 28/F particle size, in its free form, passes through a 28 mesh screen. The 28/F tabular alumina is present in an amount ranging from about 15% to about 30%, and preferably from about 20% to about 25%. In accordance with the most preferred embodiment, the 28/F tabular alumina is present at a level of about 22%. The tabular alumina of −325 particle size, in its free form, passes through a 325 mesh screen. The −325 tabular alumina is present in an amount ranging from about 20% to about 35%, and preferably from about 30% to about 35%. In accordance with the most preferred embodiment, the −325 tabular alumina is present at a level of about 33%.

Mullite is a term of art that refers to a composition containing approximately 57–73% by weight alumina, approximately 27–40% by weight silica and smaller amounts of impurities. The mullite preferred for use in the present invention is fused mullite that passes through a 10 mesh screen and is retained on a 36 mesh screen. The fused mullite should be present in an amount between about 15% and about 30%. Preferably, the fused mullite is present in an amount between about 20% and about 25%. Most preferably, the fused mullite is present at a level of about 22%.

Clay suitable for use in the refractory base material includes EPK clay, which is available from The Feldspar Corporation in Atlanta, Ga., and Tennessee #5 ball clay, which is available from Kentucky-Tennessee Clay Company in Mayfield, Kenty. The EPK clay and the ball clay are each present in an amount up to about 8%. More preferably, the clays are each present in an amount between 2% and 6%. According to a preferred embodiment, the clays are each present at a level of about 4%.

By way of example, the most preferred embodiment of the present invention is a lightweight firing container consisting of the following ingredients:

| Component | Amount (wt. %) |
|---|---|
| 28/F Tabular Alumina | 22 |
| −325 Tabular Alumina | 33 |
| 10/36 Fused Mullite | 22 |
| EPK Clay | 4 |
| Ball Clay | 4 |
| 4/10 Fused Alumina Bubbles | 7 |
| 8/20 Fused Alumina Bubbles | 7 |

Figure 2:
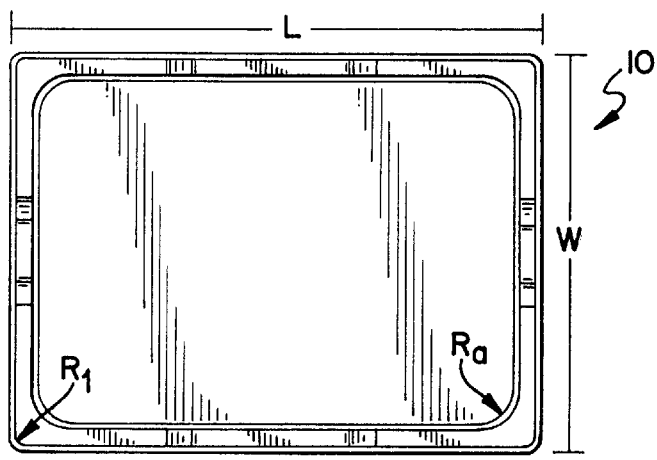
FIG. 2 is a top view of the lightweight firing container of the present invention.
Figure 3:
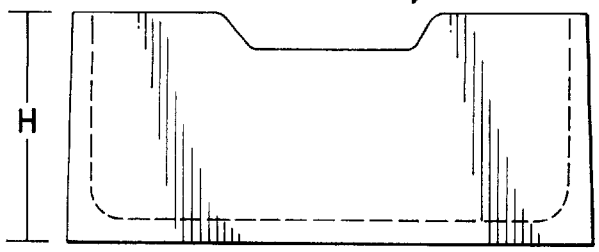
FIG. 3 is a side view of the lightweight firing container of the present invention.
Figure 4:
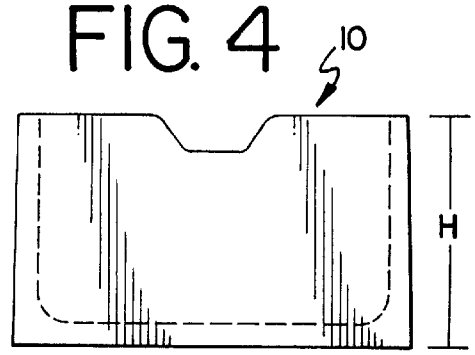
FIG. 4 is a front view of the lightweight firing container of the present invention.

FIGS. 1–4 illustrate one embodiment of a firing container 10 of the present invention. As can be seen, the firing container 10 is generally rectangular in shape. FIG. 2 is a top view of a firing container 10. The firing container 10 preferably has an outside length L of about 15 ⅜ inches and width W of about 11 ½ inches. The four inside corners each have a radius $R_1$ of about a quarter of an inch. The four outside corners each have a radius $R_2$ of about 1 inch. FIGS. 3 and 4 show the firing container of the present invention from the side and the front, respectively. The height H of the firing container may be between about 2 inches and 12 inches. Preferably, the height H is about 6 inches.

Referring now to FIG. 1, the firing container 10 is preferably a single-piece, open-top structure with four upstanding side walls 14, 16, 18 and 20. In a preferred embodiment, the firing container 10 also has a floor 12 such that the floor and side walls define a basin 22 in which spark plugs (not shown) or other objects are stored during firing. Also in a preferred embodiment, the side walls 14, 16, 18 and 20 have notches 24, 26, 28 and 30 at their respective tops. The purpose of the notches is to provide air flow during the firing period.

The lightweight firing container of the present invention can be made by first forming a casting composition by dry mixing a compound comprising from about 55–90% by weight of refractory base material comprising tabular alumina, mullite and clay and about 0.1–80% by weight fused alumina bubbles. Water is then added to the mixture of dry ingredients to obtain a compound of a desirable casting consistency. The resulting casting composition is then transferred to a plaster mold and molded into a lightweight firing container. After the casting composition is poured into the plaster mold, the mold is set on a vibrator. The vibration of the mold allows the moist casting composition to flow without segregation of the particles. After the mold absorbs some of the water in the casting composition, the resulting container is removed from the mold. The plaster mold absorbs some of the water in the casting compound to facilitate removal of the resulting container from the mold. The resulting container is removed from the plaster mold and is dried to remove the residual water. After drying, the container is fired to a temperature of approximately 3000 degrees Fahrenheit to obtain a finished product from the mold. The firing process takes about 2 days.

While the embodiments of the invention disclosed herein are presently considered to be preferred, various modifications and improvements can be made without departing from the spirit and scope of the invention. The scope of the invention is indicated in the appended claims, and all changes which fall within the meaning and range of equivalents of the claims are intended to be embraced therein.

What is claimed is:

1. A method for manufacturing lightweight firing containers, comprising the steps of:

(a) forming a casting composition by dry mixing a compound comprising from about 55–90% by weight of material comprising tabular alumina, fused mullite, clay and from about 2% to about 40% by weight fused alumina bubbles;

(b) adding water to said casting composition to obtain a desirable casting consistency;

(c) transferring said casting composition to a plaster mold; and (d) molding said casting composition to form a firing container.

2. The method of claim 1, further comprising the steps of:

(a) removing the resulting firing container from the plaster mold;

(b) drying the firing container; and (c) firing the resulting container to a temperature of approximately 3000 degrees Fahrenheit.

3. A method for manufacturing a lightweight firing container, comprising the steps of:

(a) forming a casting composition by dry mixing a compound comprising from about 35% to about 65% by weight tabular alumina, about 15% to about 35% by weight fused mullite, up to about 16% by weight clay and from about 2% to about 40% fused alumina bubbles;

(b) adding water to said casting composition to obtain a desirable casting consistency;

(c) transferring said casting composition to a plaster mold;

(d) molding said casting composition to obtain a firing container;

(e) removing the resulting firing container from the plaster mold;

(f) drying the firing container; and (g) firing the resulting container to a temperature of approximately 3000 degrees Fahrenheit.

4. The method of claim 3, wherein said tabular alumina comprises:
   (a) from about 15% to about 30% by weight fine tabular alumina passing through a 28-mesh screen; and
   (b) from about 20% to about 35% by weight tabular alumina passing through a 325-mesh screen.

5. The method of claim 3, wherein said clay comprises:
   (a) up to about 8% by weight EPK clay; and
   (b) up to about 8% by weight ball clay.

6. The method of claim 3, wherein said casting composition comprises:
   (a) from about 50% to about 60% by weight tabular alumina;
   (b) from about 20% to about 25% by weight fused mullite; and
   (c) from about 4% to about 12% by weight clay.

7. The method of claim 6, wherein said tabular alumina comprises:
   (a) from about 20% to about 25% by weight fine tabular alumina passing through a 28-mesh screen; and
   (b) from about 30% to about 35% by weight tabular alumina passing through a 325-mesh screen.

8. The method of claim 6 wherein said clay comprises:
   (a) from about 2% to about 6% by weight EPK clay; and
   (b) from about 2% to about 6% by weight ball clay.

9. The method of claim 6, wherein said fused alumina bubbles comprise:
   (a) from about 5% to about 15% by weight fused alumina bubbles passing through a 4-mesh screen and retained on a 10-mesh screen; and
   (b) from about 5% to about 15% by weight fused alumina bubbles passing through an 8-mesh screen and retained on a 20-mesh screen.

10. The method of claim 3, wherein said casting composition comprises:
    (a) about 22% by weight fine tabular alumina passing through a 28-mesh screen;
    (b) about 33% by weight tabular alumina passing through 325-mesh screen;
    (c) about 22% by weight fused mullite;
    (d) about 4% by weight EPK clay;
    (e) about 4% by weight ball clay;
    (f) about 7% by weight fused alumina bubbles passing through a 4-mesh screen and retained on a 10-mesh screen; and
    (g) about 7% by weight fused alumina bubbles passing through an 8-mesh screen and retained on a 20-mesh screen.

* * * * *